July 8, 1941. J. B. GRIFFITHS ET AL 2,248,704
RAILWAY SIGNAL AND/OR POINTS CONTROL SYSTEM
Filed March 14, 1939 2 Sheets-Sheet 1
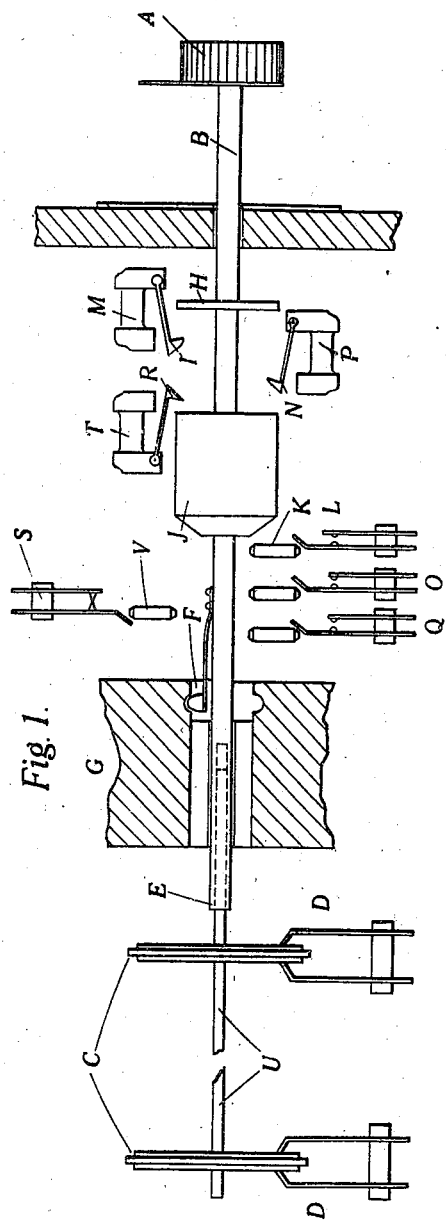
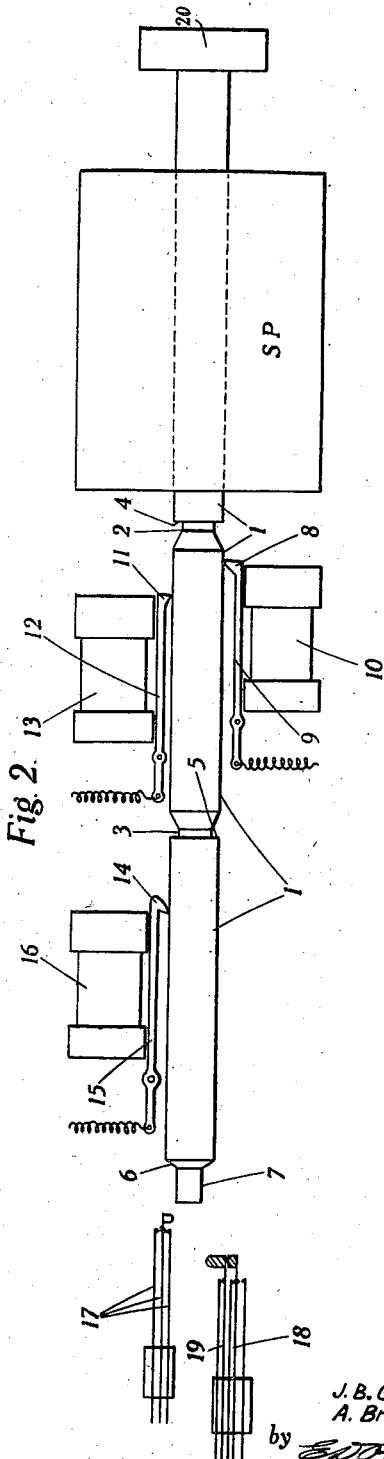
Inventors
J. B. Griffiths
A. Brown
by
Attorney

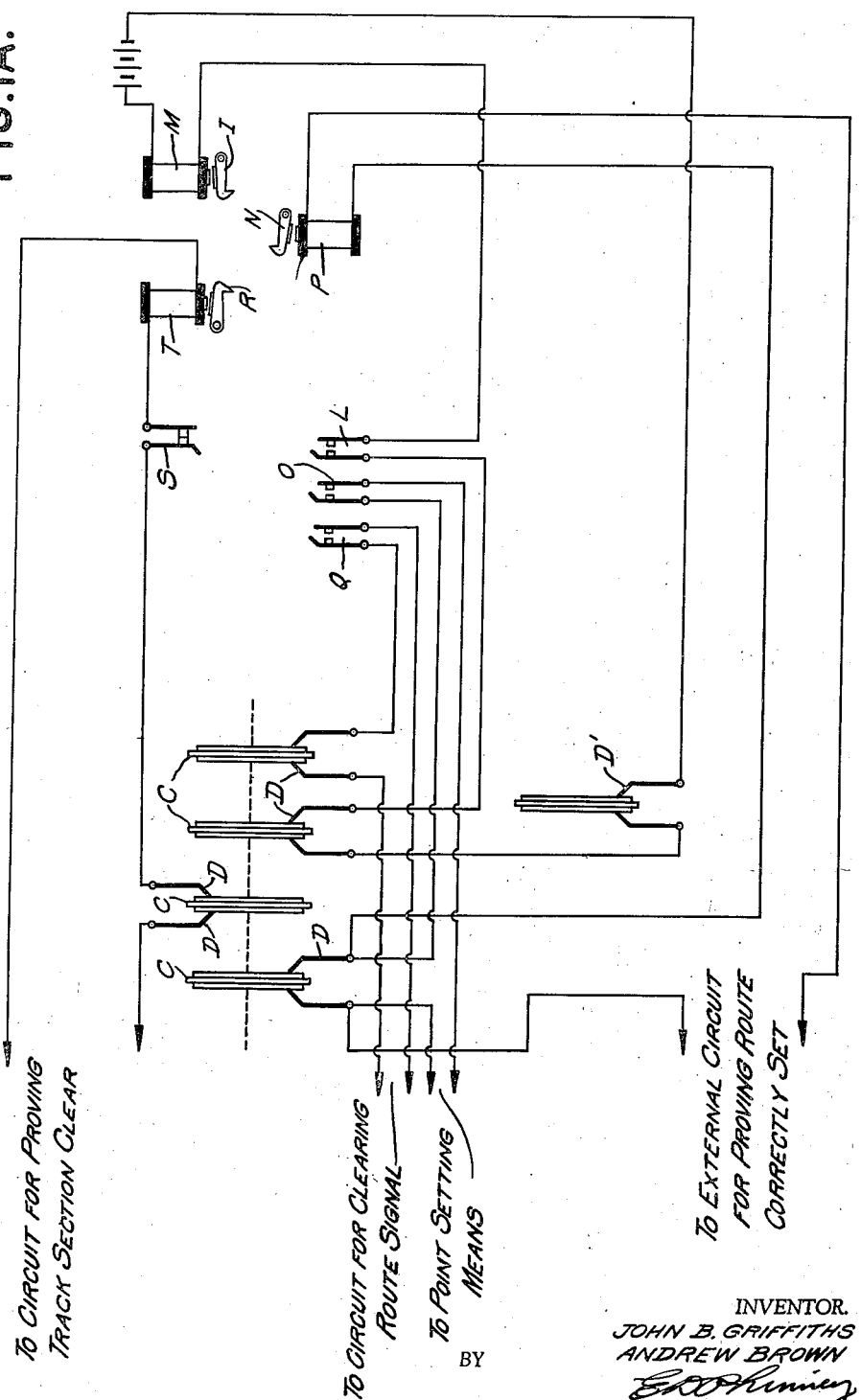

Patented July 8, 1941

2,248,704

UNITED STATES PATENT OFFICE 2,248,704

RAILWAY SIGNAL AND/OR POINTS CONTROL SYSTEM

John Balmain Griffiths and Andrew Brown, London, England, assignors to International Standard Electric Corporation, New York, N. Y.

Application March 14, 1939, Serial No. 261,700
In Great Britain March 15, 1938

5 Claims. (Cl. 246—134)

This invention relates to railway signalling systems and to manual route, points, or signal control switches for use on track-diagram control panels therefor.

Such switches have previously been capable of operation by a signalman to initiate a change of setting of points and/or signals without any indication as to whether such change is desirable from a safety point of view.

The object of the invention is to provide novel means for indicating to a signalman whether or not a points and/or signal change he proposes to make is desirable from a safety point of view. The indicating means may at the same time act as positive safeguards.

The main feature of the invention comprises a track diagram control panel incorporating manual route, points, or signal control switches and means adapted to indicate to a signalman when movement of a switch is undesirable.

The invention will be clearly understood from the following description of two embodiments shown in the accompanying drawings, in which:

Fig. 1 is a plan view of one form of manual route controlling key on a track diagram panel adapted to control the setting of any one of a number of conflicting routes in the manner described in British Patent No. 498,143, accepted March 30, 1939, corresponding to the copending application of J. B. Griffiths and A. Brown, Ser. No. 216,906, filed July 1, 1938.

Fig. 1A illustrates a circuit diagram for more completely extending the system of Fig. 1.

Fig. 2 is a plan view of an alternative form of manual route controlling key of the type shown in Fig. 1.

In the first embodiment, Fig. 1, switchgear manually operated by the panel control switches provides all the necessary interlocking in conjunction with the detection of point and track conditions. In this case the panel switches would be prevented from making any movement in response to which a dangerous condition could be set up, and the ultimate safety of the system depends upon this prevention.

In the second embodiment, Fig. 2, the panel switches are used to control motor driven switchgear in a manner similar to that described in British Patent 496,495, accepted February 23, 1939, corresponding to copending application of J. B. Griffiths and A. Brown, Ser. No. 209,198, filed May 21, 1938, and in addition interlocking of the panel switches would be provided to prevent the completion of an undesirable switch movement. In this case the safety of the system would be provided by the sequence switch interlocking, and even in the event of the interlocking on the panel switches being forced or broken, no dangerous condition could be set up. This sequence switch interlock has been fully described in the above-mentioned British Patent 496,495, and need be no further described here.

The embodiment shown in Fig. 1 will first be described.

The front view of the control switch is similar to that described in British Patent No. 498,143 and British application 24,800/38 filed August 23, 1938. The principal feature described in this British application comprises a railway track control and indicator panel provided with a multi-position manual switch, the switch including a number of inwardly projecting lugs spaced around its inner periphery and arranged to engage a member mounted on the switch shaft whenever the switch handle is moved towards the panel in such a mnner that rotation of the switch handle is prevented until it is again withdrawn from the panel.

The control knob A and associated shaft B are capable of rotation into any one of a number of angular positions to select the desired route, and thereafter must be plunged to set up the desired route.

The shaft B carries a contact-operating collar J, a detent disc H, and a spring-mounted positioning stud F. A shaft U coaxial with shaft B is so connected to a tubular portion E of shaft B that shaft U follows rotary movement of shaft B but not its axial movement. Such a coupling may be made in any well known manner, such as by a key, or by making the shaft and corresponding bore non-circular.

A group of cams C, only two of which are shown in Fig. 1, is carried by shaft U and is rotated by the shaft B so as to connect the corresponding brush pairs D as required in the various route selecting positions. These cams may be of any number, as fully set forth in British Patent 496,495, in accordance with the number of controls to be effected therethrough. As the shaft B is rotated, it is constrained to stop in successive route selecting positions by virtue of the spring loaded stud F traversing a suitably shaped track in the fixed member G in which hollows are provided. After being rotated to the desired route selecting position, the shaft B can be plunged until the disc H engages with the detent I. When plunged the detent F engages with one of a number of axial channels in the member G, and so prevents any further rotation of the shaft. During this plunging movement, the collar J depresses the smaller plunger K in vertical guides not shown, and so closes contacts L. The operation of the switch for control purposes will be clear from the following description made in connection with the simplified circuit diagram shown in Fig. 1A.

The contacts L prepare a circuit for lock magnet M via cam contacts D closed in the appropriate route position, and cam contacts D' of another panel switch or switches, said contacts being opened if a conflicting route is set or in process of being set. If no conflicting route has been set or is being set, the magnet M will be energised, lifting detent I out of engagement with the disc H, and permitting a further plunging movement of the shaft B until the disc H comes into engagement with detent N. This second plunging movement causes contacts O to be closed by collar J: the closure of contacts O in conjunction with further contacts D closed by the route selecting cams, provides a circuit for the operation of the points necessary to set up the desired route.

The locking magnet P is also connected through contacts D closed by cams C in the appropriate route selecting position to an external circuit consisting of detection contacts, proving that all the points involved in the desired route have been correctly set and if necessary that certain pre-selected track sections are clear or occupied, as required for the setting of the desired route.

If conditions are proved to be wholly favourable, the magnet P will be energised and the detent N withdrawn from engagement with the collar H, so that the shaft B may be plunged to the end of its travel. This final plunging movement operates contacts Q through the medium of collar J which, in conjunction with certain cams C and contacts D provide a circuit to clear the signal giving access to the route which has been set up.

The final plunging movement of the shaft B carries the disc H beyond the detent R. Collar J operates plunger V to open contacts S.

When the signalman attempts to withdraw the shaft B, it will only be permitted to move through a short distance until disc H comes into engagement with detent R. During this short movement, contacts Q will be re-opened, so that the signal will be restored to the "stop" aspect, but no attempt will yet be made to operate any of the points involved in the route.

Contacts S are re-closed when the shaft is partially withdrawn, and connect the back-locking magnet T via other cam-controlled contacts D to an external circuit which proves that certain track sections are clear (for example the track sections which would be occupied by a train which is about to enter upon the route which has been set).

The magnet T is energised when conditions have been proved safe for the restoration of the route set, and detent R is withdrawn from engagement with disc H, whereupon shaft B can be fully withdrawn, leaving all points free as far as this control switch is concerned, the switch itself also being free to be rotated into any other route setting position.

In order to provide more convenient access for the wiring of the various contacts and coils, it may be convenient to mount the shaft U carrying the cams C in some position other than in line with shaft B but rotatably coupled to shaft B. For example, the shaft U carrying cams might be mounted in a vertical plane coupled to the horizontal shaft B by means of bevel gears. The control of the plunging movement would, however, still be directly applied to shaft B.

It is of course possible to put certain safeguards under control of the manual switches, and other safeguards under control of sequence switch or relay interlocking equipment.

Referring now to Fig. 2, the panel control switch is capable of being rotated to any selected route position and plunged through a short distance. This operation actuates a contact assembly particular to the selected route and causes a motor driven sequence switch to drive to the desired route set through the medium of control circuits similar to those described in British Patent No. 496,495.

The switch comprises a selector portion SP identical with that described in British application No. 24,800/38. The shaft of SP (not shown) is connected to an axially-movable spindle I so that the rotary movement of the shaft has no effect on spindle I.

Spindle I is cut away at 2 and 3 to form two vertical abutment faces 4, 5 adapted to co-operate respectively with tooth-ended armatures 9, 12 of electromagnets 10, 13, and tooth-ended armature 15 of electromagnet 16.

The rear end of spindle I is cut away at 7 to form a cam surface 6 for operating contact spring pile-ups 17 and 18, 19 in turn.

To set up of a route, the handle 20 is turned to select the route position after which the switch shaft is plunged carrying with it spindle I.

The axial movement of the shaft and spindle I is limited by the fact that tooth 8 of armature 9 is forced by its spring into the cut away portion 2 of the spindle and engages the face 4.

The selector portion SP operates contacts as described in British application No. 24,800/38 to put the sequence switch which controls the desired route into operation.

The sequence switch tests whether the desired route is available in the manner described in British Patent No. 496,495, and if so moves to the route-setting position.

In this position the sequence switch has previously been arranged to close a proving circuit for a proving relay not shown, but this circuit will now be connected via normally-made contacts 17 to electromagnet 10, while the proving relay will be connected to the front contact spring of change-over contacts 17.

Thus when the sequence switch has stopped in route-setting position, electromagnet 10 energises, allowing the panel switch shaft together with spindle I to be plunged still further until the tooth of armature 12 engages the face 4 of spindle I.

This movement is sufficient to operate contact springs 17 so that the circuit of electromagnet 10 is opened and that of the proving relay is closed.

Operation of the proving relay, in conjunction with the sequence switch cams in the appropriate route-setting position, completes circuits for actuating the points necessary for setting up the desired route.

In the sequence switch system as previously arranged, when all the points for a route have been detected in their correct positions and the relevant track sections have been proved clear or occupied as required, a signal operating relay has been energized via contacts controlled by the proving relay and sequence switch cams.

For the present system, the circuit previously used for the signal-operating relay is connected to the centre spring of change-over contacts 18, the normally closed contact of which is connected to electromagnet 13 while the normally-open contact is connected to the signal-operating relay.

Assuming that the route has been correctly set up, electromagnet 13 will be operated so that the signalman can further plunge handle 20 operating contact-spring pile-up 18, 19.

The circuit for electromagnet 13 will be opened and the signal-operating relay will be energised to free the route to oncoming traffic.

Contacts 19 are opened but without effect.

The spindle 1 has now been plunged so far that tooth 14 of armature 15 snaps into recess 3 of the spindle. When the signalman attempts to withdraw the panel switch shaft, the face 5 of spindle 1 is engaged by tooth 14 after a short travel of the spindle and further movement is prevented. This movement of spindle 1 is sufficient to release pile-up 18, 19, which returns to normal so that the signal-operating relay is released and the signal returned to danger. The proving relay is still held via operated contacts 17 to retain the points in their set position.

Contacts 19 re-close and connect electromagnet 16 into a back-lock proving circuit similiar to that described in British Patent No. 496,495, for relay 1YR, Fig. 7, except that it will not include normal contacts of the route switch, that is, contacts corresponding to 5(N) in the circuit of 1YR, Fig. 7, of British Patent No. 496,495.

If the backlocking provisions allow, electromagnet 16 is energised and withdraws armature 15 from the spindle which can now be drawn out to its normal position by the signalman.

Contacts 17 are restored to normal to release the points.

After complete withdrawal of the panel switch, the individual route control contacts of SP are restored to normal, operating the backlock proving relay so that the sequence switch returns to its normal position.

It should be clearly understood that in this case the mechanical locking of the panel switch is provided to warn the signalman if he attempts to make an inadmissible move, but is not responsible for the safety of the system.

In this embodiment, the safeguards of the sequence switch control equipment also control the keys, but different arrangements for controlling the keys could be provided in which the key controls from a second line of defence from a safety point of view.

Positive control of the key movements is incorporated in this embodiment which prevent movement unless it is safe to make further movement. Arrangements could be provided however, in which key movement was possible but a warning, by lamp for instance, was given that the required points and/or signal change was unsafe and would not take place.

If individual points and signal keys are provided, interlocking circuits can be provided to free points and signal keys in sequence.

Panels incorporating manual switches as described may of course be used with relay interlocking equipment as well as with the sequence switch interlocking equipment described.

What is claimed is:

1. A railway signaling system comprising, in combination, a control panel, a plurality of route selecting devices mounted upon said panel for selecting and controlling predetermined routes, each route selecting device including a control element mounted for rotary movement to select desired routes and being movable axially to set-up a selected route, rotary route selecting switches controlled by the rotary movement of each control element, means for restricting the axial movement of at least one control element to a first position short of the position required to set-up a selected route, switch means having contacts operable to closed position by said one control element in moving to said first position, means for releasing said restricting means to permit further axial movement of said one element, and a circuit for energizing said releasing means including in serial circuit relation the contacts of said switch means, the contacts of a rotary switch controlled by said one control element, and contacts of a rotary switch controlled by a second control element of another route selecting device, said last named contacts being closed only when said second control element is in a predetermined rotary position corresponding to a route which does not conflict with the route selected by said one control element.

2. A railway signalling system according to claim 1, further comprising means responsive to said further movement of said one control element for completing a routing setting circuit.

3. A railway signalling system according to claim 1, further comprising means responsive to said further movement of said one control element for completing a point setting circuit, means for stopping said one control element after said further movement in a second position, and means responsive to correct setting of said points to complete said selected route for removing said stop means.

4. A railway signalling system according to claim 1, further comprising means responsive to said further movement of said one control element for completing a point setting circuit, means for stopping said one control element after said further movement in a second position, means responsive to correct setting of said points to complete said selected route for removing said stop means, and means responsive to movement of said one control element past said second position to a third position for completing a circuit for clearing a route signal.

5. A railway signalling system according to claim 1, further comprising means responsive to said further movement of said one control element for completing a point setting circuit, means for stopping said one control element after said further movement in a second position, means responsive to correct setting of said points to complete said selected route for removing said stop means, means responsive to movement of said one control element past said second position to a third position for completing a circuit for clearing a route signal, means for latching said one control element in said second position on its return axial movement, and means responsive to unoccupied track condition of said selected route for releasing said latching means and thereby permitting said one control element to be returned to its initial position.

JOHN BALMAIN GRIFFITHS.
ANDREW BROWN.